N. STEDMAN.
Corn Sheller and Cleaner.

No. 227,453. Patented May 11, 1880.

Attest.
E. R. Hill.
W. S. Christopher

Inventor.
Nathan Stedman
per Wm. Hubbell Fisher,
Atty

N. STEDMAN.
Corn Sheller and Cleaner.

No. 227,453. Patented May 11, 1880.

Attest. Inventor.
E. R. Hill. Nathan Stedman
W. S. Christopher per Wm. Hubbell Fisher
Atty.

N. STEDMAN.
Corn Sheller and Cleaner.

No. 227,453.

Patented May 11, 1880.

3 Sheets—Sheet 3.

Attest.
E. R. Hill
M. S. Christopher

Inventor.
Nathan Stedman
per Wm. Hubbell Fisher,
Atty.

N. PETERS, PHOTO-LITHOGRAPHER, WASHINGTON, D. C.

UNITED STATES PATENT OFFICE.

NATHAN STEDMAN, OF AURORA, INDIANA.

CORN SHELLER AND CLEANER.

SPECIFICATION forming part of Letters Patent No. 227,453, dated May 11, 1880.

Application filed September 21, 1878.

*To all whom it may concern:*

Be it known that I, NATHAN STEDMAN, of the city of Aurora, in the county of Dearborn and State of Indiana, have invented certain new and useful Improvements in Corn Shellers and Cleaners, of which the following is a specification.

My invention relates to a class of machines for shelling and cleaning corn in one and the same operation, having a shelling-chamber, a vibrating separator, and a fan to carry off the chaff or waste.

My invention consists, in general, in a new and improved apparatus, and the specific features of my invention are hereinafter fully described.

Figure 1:
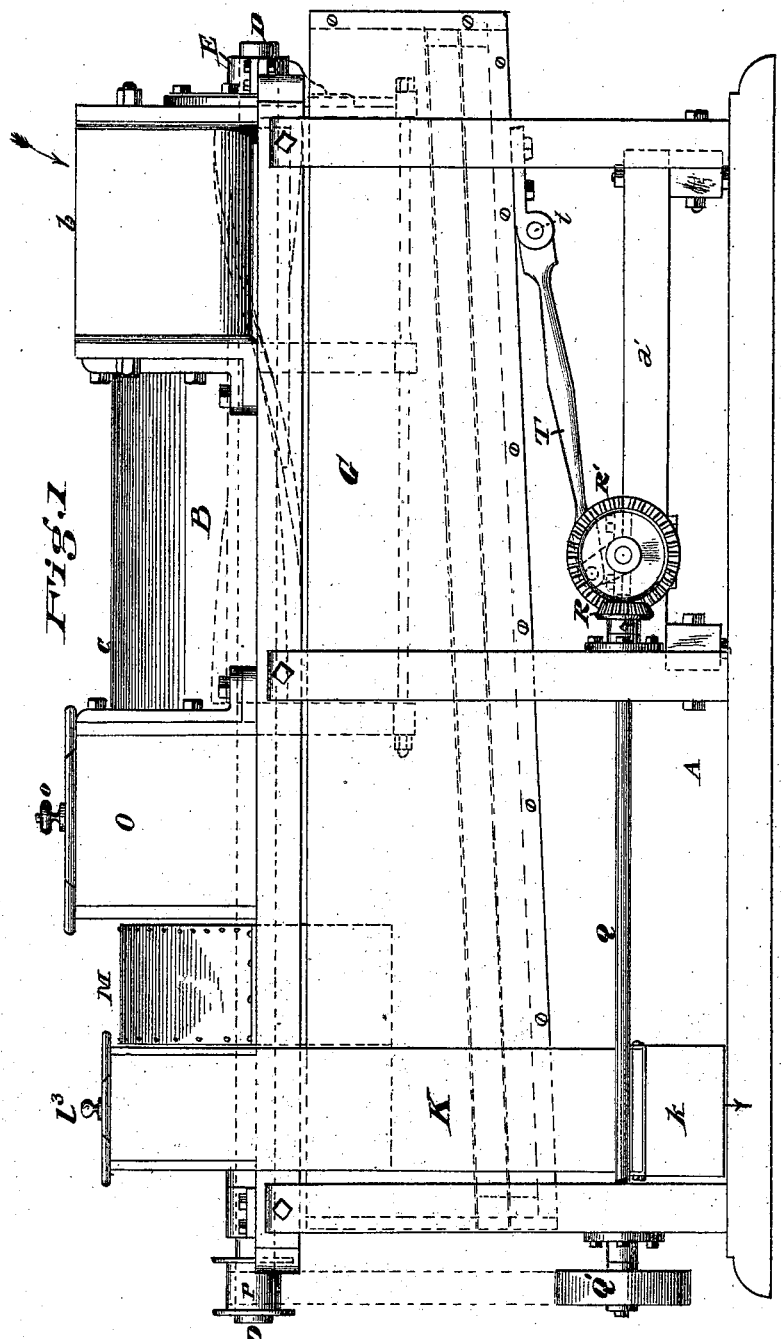
Figure 2:
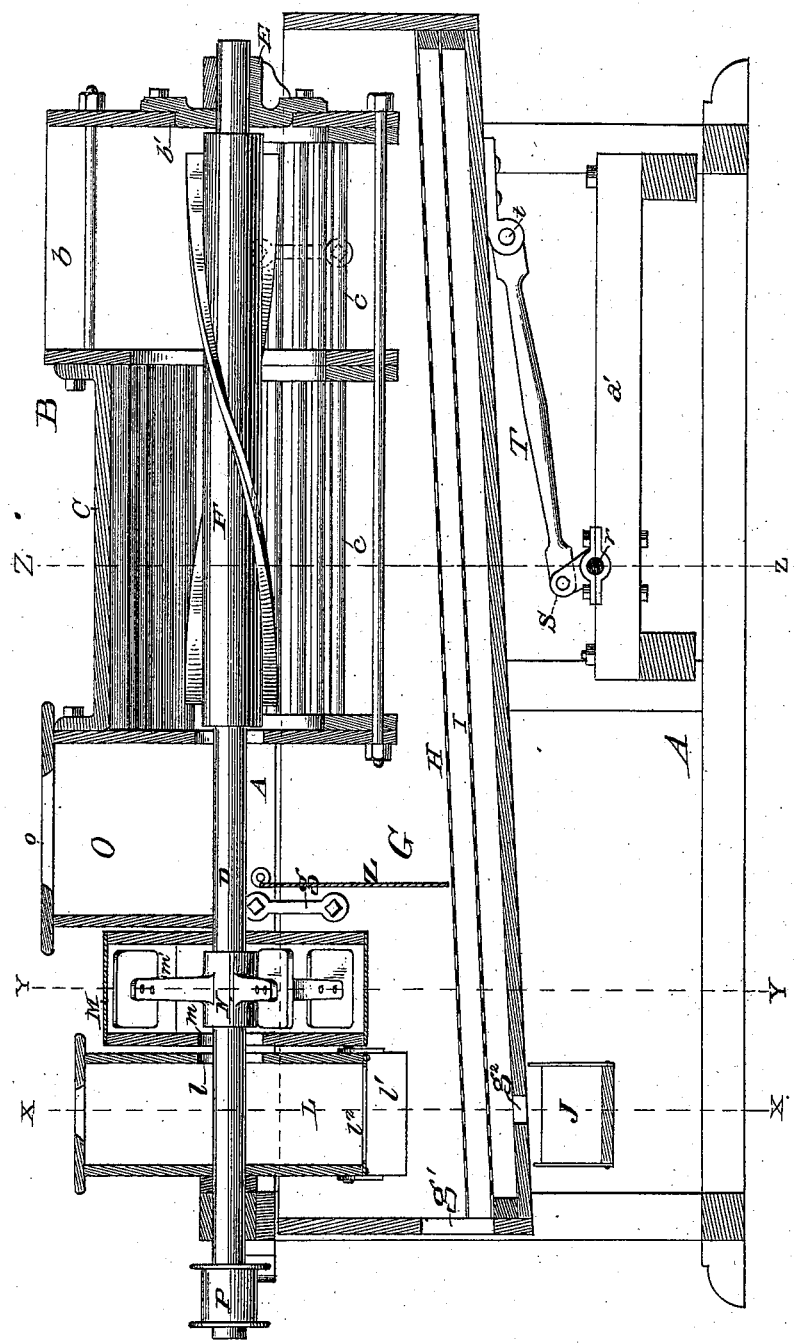
Figure 3:
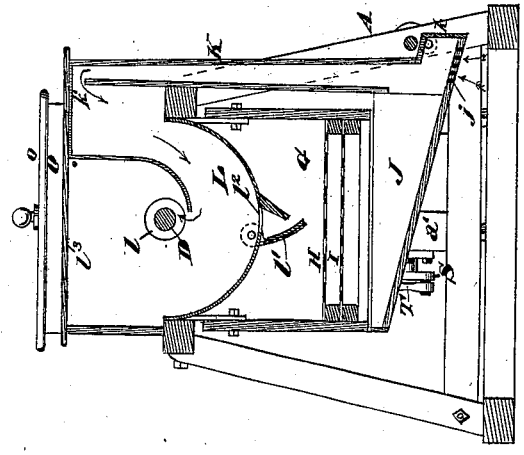
Figure 4:
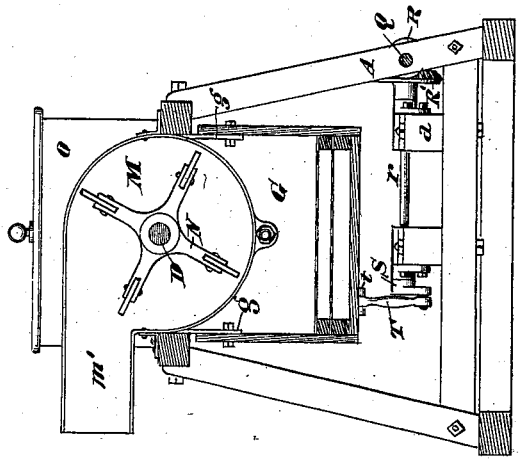
Figure 6:
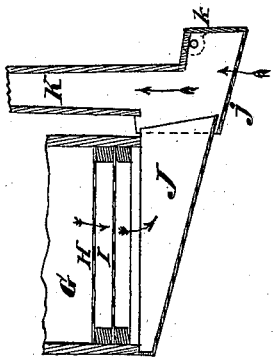
Figure 5:
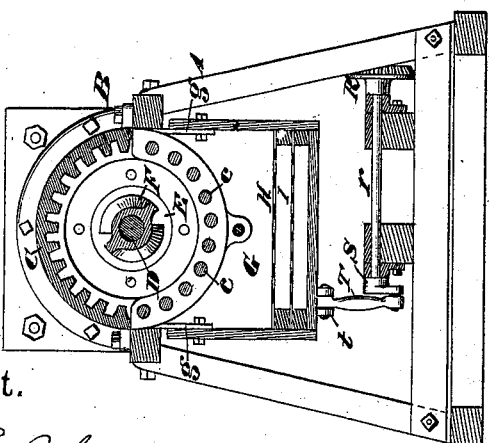

Referring to the drawings, Figure 1 represents a side elevation of the machine. Fig. 2 is a longitudinal section in elevation. Fig. 3 is a reduced transverse sectional elevation on line X X, Fig. 2. Fig. 4 is a similar section on line Y Y. Fig. 5 is a similar section on line Z Z. Fig. 6 is a section on line X X, Fig. 2, showing a modification of the device for producing an intermittent discharge of the grain.

A is the frame of the machine, constructed in the usual manner, with sills, uprights, and horizontal top beams, as shown. B is the shelling-chamber, secured to and between the longitudinal top beams of the frame, and formed with a shelling-concave, C, to extend over the shelling-cylinder, and with a latticed or open-work bottom composed of rods $c$, secured at proper distances apart in semicircular form to the heads of the chamber. The bottom exceeds the length of the concave and underlies the hopper-throat $b$, as illustrated. The concave is formed, as clearly shown in Figs. 2 and 5, with radial internal teeth or corrugations extending its entire length, and by this construction is particularly adapted to the work required of it.

Passing through and beyond the hulling-chamber is a horizontal shaft, D, which is journaled at one end in one of the upper cross-timbers of the frame A, and at the other end in a bearing, E, secured to one end of the shelling-chamber. Mounted upon this shaft, and within the shelling-chamber, is a spirally-flighted cylinder, F, (clearly illustrated in Fig. 2 of the drawings.)

Secured beneath the hulling-chamber, and between the uprights of the frame A, is a box or chamber, G, whose length is somewhat in excess of the shelling-chamber. It is hung from the frame A by means of links $g$, so as to be free to vibrate in the direction of its length, and it has an inclined bottom, whose high point is beneath the shelling-chamber, from whence it inclines gradually downward to its opposite end.

Located near its bottom are screens H I, one above the other, and at a suitable distance apart, and extending the entire length of the machine. The interstices of these screens are of different sizes, the uppermost one having the largest, and serving to collect only the coarser chaff and to conduct the cobs to the opening $g'$ in the chamber, while the lower one has the smaller openings, and serves to collect much of the smaller pieces of cob and the coarser chaff, while permitting the corn to pass through it upon the bottom of the chamber G. A certain amount of chaff which passes through the first screen will be collected by the second one and carried out at the opening $g'$ aforesaid.

The bottom of the chamber G is provided, near its lowest end, with an opening, $g^2$, to conduct the corn therefrom, and immediately beneath this opening is an inclined chute, J, to receive the corn and conduct it away. This chute connects with a perpendicular conduit, K, and may be separate from the separating-chamber G, and secured to this conduit, as shown in Fig. 2, or a portion thereof be secured to the separator, and be agitated therewith, as shown in Fig. 6.

The conduit K passes upward outside the frame A, and connects with a chamber, L, located around shaft D and secured between the upper timbers of the frame. This chamber, by means of an annular opening, $l$, around the shaft, connects with a fan-chamber, M, also located around the shaft, and provided with an opening, $m$, contiguous to the opening $l$ aforesaid. The fan-chamber is provided with an outlet-opening, $m'$, as seen in Fig. 4.

The fan N is secured upon shaft D, as shown, and when in motion produces a draft from the separating-chamber, which draft, passing through chamber L, through openings $l\,m$, and out at opening $m'$, serves to carry off the chaff from the separating-chamber.

The chamber L is provided at its bottom with a door, $l'$, which acts automatically, and is kept closed when the machine is in motion by the suction of the fan, except when forced open by the weight of corn gathering upon it, as more particularly hereinafter described, and it is provided at its top with a slide, $l^3$, which may be opened to decrease the power of the draft through the conduit K.

Between the fan-chamber and the thrashing-chamber, and overlying that part of the separating-chamber, is a chamber, O, which is left as a space for the discharge of the cobs from the shelling-chamber. These cobs, with whatever corn that comes through, are discharged on the screen. This chamber O is provided with slide $o$ for convenience of reaching the interior of the chamber.

A hinged door, Z, (see Fig. 2,) is located in the cob-chamber O. This door is made long enough to come near the screens, and prevents any corn that may come through the sheller from flying out with the cobs as it (the hinged door) precipitates the corn upon the screen.

Located in the side and contiguous to the bottom of the conduit is an opening guarded by a door, $k$, in line with the chute J, through which the corn is to be delivered, and the suction generated by the fan in the conduit serves to hold this door in a closed position sufficiently long to enable the collection of a sufficient weight of grain, when the weight of the grain will overcome the resistance, and by forcing open the door precipitate itself into any receptacle placed beneath.

To insure a draft in the conduit K holes $j$ are formed in the bottom of the chute directly beneath the conduit, as clearly shown in Fig. 3 of the drawings.

To direct the draft in from the top of the conduit down so the grain and heavy particles drawn up it will have a falling motion, and by the momentum so gained to pass by the power of the draft into the vacuum-chamber, it has been found desirable to extend an apron from the top of chamber L and down around the shaft D, so that the apron shall terminate near the opening leading to the fan-chamber.

This construction, it will readily be seen, serves to extend the conduit, as it were, to the point of the opening $l\,m$, leading to the fan-chamber.

In order to permit the removal of the shaft D without necessitating the disengagement of the cylinder therefrom, I provide the end of the shelling-chamber, which supports one end of the shaft, with a circular opening, $b'$, having a greater diameter than the cylinder, and the bearing E is provided with a flange, which fits against the shelling-chamber and covers this opening, and whereby said bearing can be secured in position by bolts. Now, by the removal of the bearing E an opening is provided sufficiently large to accommodate the passage of the shaft and cylinder.

In the removal of the shaft, however, it will be necessary to detach the fan and a pulley, P, which transmits power to the devices for operating the separating-chamber.

The motion of the separating-chamber is secured by the revolution of counter-shaft Q on the frame A, operating through bevel-gear R R', crank-shaft $r$, crank S, and pitman T, the pitman being secured between the crank S and a pivot-bearing, $t$, upon the under side of the separator. The crank-shaft $r$ is secured in bearings upon the timbers $a'$ of the frame.

The shaft Q is provided with a pulley, Q', to receive power by belt from pulley P on main shaft D, the size of the pulley Q' being greatly in excess of pulley P, in order to decrease the speed of the motion transmitted to shaft Q.

The power is applied to the machine through a pulley secured upon shaft D in the usual manner, but not shown in the drawings.

In the operation of the machine the corn on the cob is fed into the thrashing-chamber through throat $b$, and, after being completely shelled by the rapid action of the cylinder F against the concave C and the rods $c$, the whole is allowed to pass through the bottom of the chamber between rods $c$ and fall upon the first screen of the vibrating separator. Here the corn and finer particles of cob and chaff pass through the first screen and fall upon the second one, and gradually work to the lowest point thereof, and are discharged at opening $g$, while the coarser particles of cob gravitate along the upper screen in the same direction, and are discharged through opening $g'$. Now, the corn again passes through the second screen to the bottom of the separator, while the fine particles of cob and the chaff are precipitated through opening $g'$. The corn thus separated falls through the opening $g^2$ into the chute J and gravitates toward door $k$ in the side of the conduit K, where it collects in quantity until sufficiently heavy to overcome the strength of the draft through the conduit that secures the door, when it forces open the door and precipitates itself into any receptacle provided. By this arrangement the discharge becomes intermittent, and the draft in the conduit may be so regulated in strength by the sliding gate $l^3$ on top as to lift all particles lighter than the corn. The finest of the chaff will pass through the holes in the lower screen and gravitate with the shelled corn into the conduit K, where all of the chaff is removed by means of the suction of the fan, which draws air rapidly up through the holes $j$ in the bottom of the chute, and through the corn in the latter, and carries the chaff up the conduit K into the chamber L, thence through openings $l\,m$ around the shaft D into fan-chamber M, whence the chaff is expelled through the exit-orifice $m'$.

Any grain that may perchance have been drawn, together with the chaff, up conduit K by the force of the suction by the fan will pass over at K', as shown by arrows, into chamber L. The momentum it gets by falling will cause it to fall to the bottom of this chamber out of the way of the blast, and it will lie against the door $l'$. When the weight of the superincumbent grain gathering on the door is sufficient to overcome the upward pressure of the draft caused by the suction of the fan it will open and allow the grain to pass down onto the screens, and back into the chute J, and out at the door $k$.

Having thus described my invention, I claim—

1. The combination of the vibrator G, the upright conduit K, provided with perforated bottom and side door, $k$, intervening draft-chamber, L, door $l'$, annular opening $l$ around the fan-shaft, fan, and fan-chamber M, and opening $l^2$, substantially as and for the purposes set forth.

2. The vertical conduit K, connected at the side to vibrator G by chute J, and provided with stationary perforated base and side door, $k$, substantially as and for the purposes specified.

3. The vertical conduit K, connected at the side to vibrator G by chute J, and provided with stationary perforated base and side door, $k$, and connected at top to the intervening draft-chamber L, provided with opening $l^2$ and door $l'$, in combination with a suction-fan, substantially as and for the purposes described.

4. The combination of the suction-fan, the vibrator G, provided with one or more screens and placed beneath the cylinder and fan, the chute J, the vertical conduit K, provided with stationary perforated base and door $k$, and the draft-chamber L, provided with valved opening $l\ l^2$, arranged to deliver upon the screen, substantially as and for the purposes set forth.

NATHAN STEDMAN.

Attest:
  J. W. GIBSON,
  THOMAS FOLTRE.